3,243,457
PROCESS FOR PRODUCING PURIFIED TEREPHTHALIC ACID
Kazuo Ogata, Ehime-ken, and Seiji Uno and Fumio Uno, Yamaguchi-ken, Japan, assignors to Teijin Limited, Nishi-ku, Osaka, Japan, a corporation of Japan
No Drawing. Filed Apr. 5, 1963, Ser. No. 270,809
1 Claim. (Cl. 260—525)

This invention relates to a process for producing purified terephthalic acid.

A process for producing an alkali metal salt of terephthalic acid by subjecting an alkali metal salt, particularly potassium salt, of an aromatic carboxylic acid such as phthalic acid, isophthalic acid or benzoic acid, to a high temperature in the atmosphere of carbon dioxide in the presence of a suitable catalyst is known, and is called Henkel process. Said Henkel process is one of the highly valuable means as a step in the production of terephthalic acid, which in turn provides a starting material for manufacture of polyester textiles.

The process of treating the product of Henkel process (which may be hereinafter referred to as the rearrangement product), that is, crude alkali terephthalate, with an acid to free the terephthalic acid is also known. For example, terephthalic acid may be separated by the steps of dissolving the rearrangement product in water, filtering out the insoluble matters, and if desired, treating the filtrate with activated carbon, and treating the same with a mineral acid such as hydrochloric acid. The most advantageous method for freeing terephthalic acid from aqueous solution of crude alkali terephthalate by means of acid is, for example, as disclosed in U.S. Patent No. 2,905,709 (German Patent No. 960,986), the process wherein as the acid, an aromatic carboxylic acid such as phthalic acid or benzoic acid, or corresponding acid anhydride is added to an aqueous solution of crude alkali terephthalate of relatively low concentration, so as to separate terephthalic acid as well as to recover the alkali in form of its salt with the acid added, said alkali salt then being recycled as the starting material of Henkel process.

As an alternative means, as disclosed in U.S. Patent No. 2,841,615 (German Patent No. 1,063,593), the reaction of crude alkali terephthalate with an aromatic carboxylic acid for freeing terephthalic acid may be performed in two stages. For example, as shown in the reaction formulae below, first an aqueous solution of rearrangement product of which main component is potassium terephthalate is added with an aqueous solution of acid potassium salt of phthalic acid and heated, so as to form acid potassium salt of terephthalic acid (precipitate) and potassium phthalate (in the mother liquor). Then the acid potassium salt of terephthalic acid is separated and dissolved in water, to which phthalic acid or phthalic acid anhydride is added, and the solution is thereafter heated to form terephthalic acid (precipitate) and an acid potassium salt of phthalic acid (in the mother liquor).

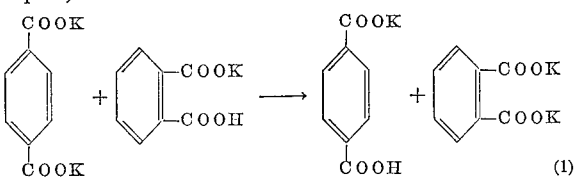

The aqueous solution of the acid potassium phthalate obtained by the second stage reaction of the above is recycled for use in the first stage reaction, and the aqueous solution of potassium phthalate obtained in the first stage reaction is recycled for use as the starting material of Henkel process after being dried by evaporation or by spraying.

As another alternative means, U.S. Patent No. 2,930,813 (German Patent No. 1,081,877) discloses a process wherein carbon dioxide is blown into aqueous solution of crude alkali terephthalate to separate acid terephthalate, and thereafter terephthalic acid is freed by the reaction of that acid salt with an aromatic carboxylic acid such as phthalic acid.

However, those terephthalic acids obtained by these known processes are not of satisfactory purity. Such terephthalic acid suitable for production of polyalkylene terephthalate which can directly react with an alkylene glycol or derivatives thereof to form fibers and films is required to have a high purity. Particularly the degree of coloration of such terephthalic acid to be used for the above described purpose is preferably below about 0.040 in terms of optical density of 20 wt. percent of the terephthalic acid dissolved in an aqueous solution of potassium hydroxide (measured at a wave length of 380 m$\mu$). Further when the object product is fibers for clothing, the optical density should preferably be 0.030 or less. Therefore it has been proposed heretofore that, before freeing crude terephthalic acid, its material, alkali terephthalate should be refined.

For example, German Patent No. 1,015,785 discloses that, after filtering out the insoluble matters from the solution of the rearrangement product, by concentrating the remaining solution, alkali terephthalate precipitates, and is separated as a cake, while at that time the greater parts of the catalyst and promoter used for the rearrangement reaction and the unreacted materials and side product remaining in the mother liquor. However for producing alkali terephthalate by such a process in good yield, it is necessary to concentrate the solution until the precipitated solid component reaches 50–85 wt. percent to the total, even with such the yield of alkali terephthalate being 75–98 wt. percent and its purity being 95–99%. Furthermore in order to obtain alkali terephthalate by the process in good yield, thus concentrating of the solution to a very high concentration is necessary, which adversely affects the purity of the resultant alkali terephthalate, and makes the removal of the coloring impurities difficult. Again treating of slurry of such high concentration efficiently is industrially very troublesome. While alkali terephthalate of high purity is desired, the solution cannot be concentrated over certain limit, and consequently the yield of alkali terephthalate will become low. Such is naturally industrially very disadvantageous.

Further the process for producing terephthalic acid including the step disclosed in said German Patent No. 1,015,785 is disadvantageous in that an additional evaporator must be equipped for concentrating the aqueous solution of crude alkali terephthalate according to the disclosure of the said patent.

Accordingly, one of the main objects of this invention is to provide a process for producing terephthalic acid of high purity, especially that of low coloring impurities content.

Another object of this invention is to provide a process for producing refined terephthalic acid which can, upon being polyesterified directly with an alkylene glycol, produce a polyester fully satisfactory for textiles and film use.

Particularly another object of this invention is to provide an economically advantageous cyclic process for producing purified terephthalic acid.

Other objects and advantages of this invention will become apparent from the following descriptions.

The foregoing objects can be accomplished by the process of this invention, which comprises preparing an aqueous solution of crude alkali terephthalate obtained by the thermal rearrangement reaction of an alkali metal salt of an aromatic carboxylic acid and of at least 10 wt. percent based on said crude alkali terephthalate of alkali phthalate, concentrating said aqueous solution by evaporation to separate and recover refined alkali terephthalate, then treating said refined alkali terephthalate with an acid according to the known practice.

This invention covers, as a preferred embodiment, the process comprising (a) preparing an aqueous solution containing the crude alkali terephthalate obtained by the thermal rearrangement reaction of alkali phthalate and at least 10 wt. percent based on said crude alkali terephthalate of alkali phthalate, (b) concentrating said aqueous solution by evaporation and separating the resultant refined alkali terephthalate from the mother liquor, and (c) treating the refined alkali terephthalate with phthalic acid in an aqueous phase, wherein the alkali phthalate recovered from the mother liquor obtained by the above step (b) is cycled and re-used as the starting material for the thermal rearrangement reaction of step (a), and the aqueous solution of alkali phthalate obtained in the step (c) is also cycled and re-used as the alkali phthalate for the preparation of the aqueous solution of the step (a).

It is important for the practice of the process of this invention that the water-soluble component in the rearrangement action product (mainly alkali terephthalate) must be once dissolved in water. While it being also possible to dissolve in water the rearrangement reaction product of which main component is crude alkali terephthalate, and an alkali metal salt of phthalic acid to be added to the rearrangement product, or to prepare an aqueous solution by adding to an aqueous solution of alkali phthalate of relatively low concentration the rearrangement reaction product, generally the preferred embodiment comprises first dissolving the rearrangement reaction product in water, filtering the same to remove the insoluble matters, optionally treating the remaining solution with activated carbon, and thereafter adding to the solution alkali phthalate or its aqueous solution. As such an aqueous solution of alkali phthalate, that is obtained during the step of treating refined alkali terephthalate with phthalic acid in aqueous phase to free the desired refined terephthalic acid, may be conveniently used. Such aqueous solution may contain some acid salts of phthalic acid, so far as the amount of the salts does not exceed the equivalent of alkali carbonate which is in certain cases contained in an aqueous solution of rearrangement reaction product. However it is generally not recommendable to use a mother liquor of relatively high acid salts content for the process of this invention. Because a part of the acid salts would remain in the mother liquor after separation of alkali terephthalate therefrom, such mother liquor then providing a poor material for the rearrangement reaction with which the rearrangement reaction yield is low.

According to the process of this invention, the amount of alkali phthalate to be contained in the aqueous solution of the crude alkali terephthalate and alkali phthalate must be at least 10 wt. percent based on the crude alkali terephthalate present. When the amount of alkali phthalate in the aqueous solution is less than that, desired object and advantages cannot be attained. On the other hand, the maximum content of alkali phthalate is subject to restrictions from the practical standpoint, although not critical. Generally the higher the concentration of alkali phthalate in the aqueous solution, the less the amount of alkali terephthalate soluble together in a solution. Solubility of potassium terephthalate (g./100 g. of aqueous solution of potassium phthalate) in aqueous solutions of potassium phthalate of various concentrations, at 40° C. and 60° C. are as shown in the table below.

| Concentration of Potassium Phthalate (wt. percent) | Solubility of Potassium Terephthalate | |
| --- | --- | --- |
| | 40° C. | 60° C. |
| 10 | 22.4 | |
| 15 | 17.9 | |
| 20 | 14.0 | 15.9 |
| 30 | 7.1 | 8.5 |
| 40 | 2.6 | 3.5 |
| 60 | Nil | Nil |

Therefore when an aqueous solution of crude alkali terephthalate is mixed with alkali phthalate or its aqueous solution to result in a mixed liquid of high alkali phthalate content, often alkali terephthalate precipitates immediately after the mixing. The crystals of such alkali terephthalate being very fine, the presence of a great amount of such is not desirable because it makes the subsequent processing difficult due to its poor separability and de-bubbling property. From such point of view, it is practically preferable in accordance with this invention that the concentration of the alkali phthalate in the aqueous solution containing alkali phthalate and crude alkali terephthalate be controlled to not higher than about 40%. In most cases, the preferred range is within about 1–35 wt. percent.

Thus prepared aqueous solution containing crude alkali terephthalate and alkali phthalate is concentrated by evaporation. As the evaporation proceeds, the concentrations of alkali terephthalate and alkali phthalate in the aqueous solution become higher, and finally alkali terephthalate starts to precipitate. The alkali terephthalate concentration in the aqueous solution when the precipitation starts in the process of this invention is far lower than that in case of alkali terephthalate precipitating from its homogeneous aqueous solution. In other words, according to this invention, the amount of alkali terephthalate remaining in the mother liquor (concentrated aqueous solution of alkali phthalate) is far less than that in case of the process disclosed in German Patent No. 1,015,785. If the concentration is carried out until the alkali phthalate concentration in the concentrated mother liquor reaches about 55 wt. percent substantially all the alkali terephthalate in the solution precipitates. Thus according to this process the precipitation of alkali terephthalate can be effected with good yield. Further during the precipitation of alkali terephthalate, there is recognized a tendency that the objectionable impurities remain in the mother liquor. One advantage of the process of this invention is that the amount of mother liquor at the time of precipitation of alkali terephthalate being larger, the undesirable impurities effectively remain in the mother liquor in which they are dissolved.

Generally in production of terephthalic acid including the steps of subjecting alkali phthalate to thermal rearrangement reaction, and treating the resultant alkali terephthalate with phthalic acid in an aqueous phase, the step of concentrating the aqueous solution of alkali phthalate by evaporation is necessary at least by one system. Further if such cyclic process for producing terephthalic acid is combined with the process disclosed in aforesaid German Patent No. 1,015,785, the step of concentrating the aqueous solution of crude alkali terephthalate by evaporation is necessary by still one more system.

In contrast to this, according to the preferred embodiment of this invention, the system for concentration by two evaporations can be combined into one step to a certain degree. That is, the step of concentrating the aqueous solution containing crude alkali terephthalate and alkali phthalate by evaporation can, to a certain degree, also serve for the concentration step of aqueous solution of alkali phthalate by evaporation conventionally practiced.

The concentrated mother liquor remaining after the separation of alkali terephthalate precipitated during the evaporation-concentration step of this invention may be further evaporated, dried and solidified by, for example, a spray drier, and cycled for re-use as the starting material for thermal rearrangement reaction.

The alkali terephthalate obtained is treated with an acid according to the known practice. That acid treatment per se is known as described hereinbefore. By the preferred embodiment of this invention, alkali terephthalate is treated with phthalic acid or phthalic acid anhydride in an aqueous phase. Such treatment with phthalic acid has been disclosed in U.S. Patent Nos. 2,905,709 and 2,841,615 (German Patent No. 1,063,593). The aqueous solution of alkali phthalate obtained in the acid treating step is, as already mentioned, cycled and re-used for the preparation of the aqueous solution containing crude alkali terephthalate and alkali phthalate, which is to be concentrated according to this invention.

By another preferred embodiment of this invention, as disclosed in U.S. Patent No. 2,930,813 (German Patent No. 1,081,877), carbon dioxide is blown into an aqueous solution of alkali terephthalate to produce acid alkali terephthalate (precipitate) and acid alkali carbonate (in the mother liquor), and then the acid salt of terephthalic acid is reacted with phthalic acid in an aqueous phase so as to produce terephthalic acid (precipitate) and acid potassium phthalate (in the mother liquor). In that case, a solution, of which main component is alkali phthalate, can be obtained by mixing the two mother liquors and boiling the same to expel carbon dioxide therefrom. The resultant solution can be cycled and re-used for preparation of the aqueous solution containing crude alkali terephthalate and alkali phthalate, which is to be subsequently concentrated.

The terephthalic acid produced by the process of this invention is of pure white having a purity of 99.9% or higher after being washed with water. Its 20 wt. percent solution in an aqueous solution of potassium hydroxide has an optical density (measured at a wave length of 380 m$\mu$) of less than 0.025.

Such terephthalic acid produces polyesters of fully satisfactory quality when directly polyesterified by alkylene glycol.

Examples being given hereinafter in order to still fully explain the manner of practice of this invention, it should be understood that the scope of this invention is in no way limited by these examples and the foregoing descriptions, except as defined in the appended claims. Further Example 1 is a control shown for comparison, and is not the embodiment of this invention.

*Example 1*

One hundred (100) kg. of an aqueous solution of the rearrangement reaction product from which the insoluble matters were removed (containing 17.3 kg. of potassium terephthalate, 0.7 kg. of $K_2CO_3$ and 1.1 kg. of other potassium carboxylates) was concentrated in vacuo in an evaporation vessel. The concentration was stopped at the point when 68.2 kg. of water was evaporated. The remaining liquid was cooled to 20° C., and 16.3 kg. of the precipitated cake was separated by a centrifugal machine. The resultant wet cake was dried to yield 15.1 kg. of dry cake. Said cake contained 14.9 kg. of potassium terephthalate, 0.08 kg. of $K_2CO_3$ and 0.12 kg. of other potassium carboxylates. The purity of the potassium terephthalate was 98.7 wt. percent, and its yield was 86.0 wt. percent.

Whereas, another cake obtained from 100 kg. of the same aqueous solution from which 72.7 kg. of water was evaporated and which subsequently cooled to 20° C. weighed 18.9 kg. in the wet state, and 16.6 kg. when dried. The cake contained 16.1 kg. of potassium terephthalate, 0.2 kg. of $K_2CO_3$, and 0.3 kg. of other potassium carboxylates. Said potassium terephthalate had a purity of 97.1 wt. percent, and its yield was 93.0 wt. percent. When the same cake was washed with 5 kg. of water and dried, the potassium terephthalate in the cake had a purity of 99.1 wt. percent, and its yield was 91.0 wt. percent. The cake was then dissolved in water and added with acid potassium phthalate so as to precipitate acid potassium terephthalate. After separation by filtration, the cake was added with phthalic acid anhydride so as to precipitate terephthalic acid. The terephthalic acid subsequently separated by filtration, washed and dried had a purity of 99.9% and its 20% solution in an aqueous potassium hydroxide solution had an optical density of 0.034 when measured at a wave length of 380 m$\mu$.

*Example 2*

One hundred (100) kg. of the aqueous solution described in Example 1, which was prepared by dissolving the rearrangement reaction product in water and removing insoluble matters therefrom, were added with 100 kg. of 20 wt. percent aqueous solution of potassium phthalate, and concentrated in vacuo in an evaporation vessel. When 148.2 kg. of water were evaporated, the concentration was stopped, and the remaining solution was cooled to 40° C. The precipitated cake was then separated by a centrifugal machine, and washed with 5 kg. of water. Thus 18.5 kg. of wet cake were obtained. Upon drying, the cake weighed 17.0 kg. The potassium terephthalate in the cake had a purity of 99.8%, containing a very little amount of potassium phthalate. After washing, potassium terephthalate was obtained with 98.1 wt. percent yield. The washing liquid of that time was returned to the evaporation vessel.

The terephthalic acid obtained from this potassium terephthalate in the similar manner as in Example 1 above, when made into 20 wt. percent solution dissolved in an aqueous solution of potassium hydroxide, had an optical density of 0.025 (measured at wave length of 380 m$\mu$).

*Example 3*

Thirty (30.0) kg. of a dry cake of potassium terephthalate obtained from the similar solution of reaction product as described in Example 2 were dissolved in 103 kg. of water. The resultant solution was passed through a column filled with activated carbon, added with 1.1 mol times to the potassium terephthalate of 20 wt. percent solution of acid potassium phthalate (1), boiled for 20 minutes, and cooled to 20° C. Thus precipitated acid potassium terephthalate (2) was removed. The same filtrate contained mainly potassium phthalate, and also minor amounts of acid potassium phthalate and acid potassium terephthalate.

The filtrate was mixed with 160 kg. of aqueous solution of rearrangement reaction product (containing 32.6 kg. of potassium terephthalate, 0.9 kg. of potassium carbonate, and 1.8 kg. of other postassium carboxylates), from which 290 kg. of water were subsequently distilled off. The precipitated solid component was separated by a centrifugal machine. At that time the filtrate had a pH of 8.6. In the filtrate, potassium terephthalate was scarcely present. The filtrate was then evaporated, dried and solidified, and cycled for re-use in the rearrangement reaction.

The precipitated acid potassium terephthalate in the amount of 25.1 kg. was reacted with 20.1 kg. of phthalic acid anhydride, and resultingly precipitated terephthalic acid was separated by filtration. The filtrate containing mainly acid potassium phthalate (1) was cycled for re-use in the preceding step, and the terephthalic acid cake was washed with hot water, and dried. That terephthalic acid had a purity of above 99.9%, and the optical density of its 20% aqueous alkali solution was 0.021 measured at a wave length of 380 m$\mu$.

*Example 4*

Seventeen (17.0) kg. of potassium terephthalate obtained by a concentration similar to that of Example 2 where dissolved in 80 kg. of water, and cooled to 40° C. Carbon dioxide of 12 atmospheres was blown into that aqueous solution, and the resultant precipitate was filtered in the atmosphere of $CO_2$. By the filtration on 20.4 kg. of wet cake of which main component was monopotassium terephthalate were obtained and upon drying the cake weighed 14.8 kg. The cake was further added with 130 kg. of water and 11.1 kg. of phthalic acid anhydride, heated and boiled, and reacted for an hour. The precipitated solid matter was separated by a centrifugal machine, throughly washed with hot water and dried, to yield 11.4 kg. of terephthalic acid. The filtrate obtained by the aforesaid filtration of monopotassium terephthalate and the filtrate remaining after the separation of terephthalic acid were mixed and boiled for three hours. The resultant aqueous solution mainly of potassium phthalate was mixed with 100 kg. of aqueous solution obtained by dissolving the rearrangement reaction product in water and removing insoluble matters therefrom (said solution contained 17.3 kg. of potassium terephthalate, 0.7 kg. of $K_2CO_3$ and 1.1 kg. of other potassium carboxylates), the mixture then was concentrated by evaporation of water until the concentration of potassium phthalate in the concentrated mother liquor reached 55%. Then the mother liquor was cooled to 40° C., the precipitated solid component being removed therefrom by a centrifugal machine. The filtrate was further exaporated, dried and solidified by a spray drier, and used as the material for the rearrangement reaction. In the concentrated mother liquor hardly any potassium terephthalate was present.

The solid component taken out was washed with water and dried. 17.0 kg. of the solid were obtained, of which purity as potassium terephthalate was 99.6%. The solid was treated with $CO_2$ and phthalic acid anhydride as described hereinbefore, and the precipitated terephthalic acid was filtered, and thoroughly washed with hot water. The resultant terephthalic acid had a purity above 99.9%, and 20 wt. percent aqueous solution of its potassium salt had an optical density of 0.027.

What is claimed is:

In a process for producing purified terephthalic acid by a two-step potassium interchange consisting of (I) reacting dipotassium terephthalate with mono-potassium phthalate in an aqueous medium to form mono-potassium terephthalate and dipotassium phthalate, separating the mono-potassium terephthalate from a mother liquor containing dipotassium phthalate, and (II) reacting the mono-potassium terephthalate obtained in step (I) with a phthalic acid or anhydride thereof in an aqueous medium to form terephthalic acid and mono-potassium phthalate, separating the terephthalic acid from a mother liquor containing the monopotassium phthalate, the improvement which comprises obtaining dipotassium terephthalate to be used in said step (I) by concentrating an aqueous solution containing the reaction product obtained by the Henkel rearrangement reaction together with the mother liquor containing the dipotassium phthalate obtained in step (I) said dipotassium phthalate being at least 10% by weight based on the terephthalate obtained in the rearrangement reaction product.

References Cited by the Examiner

UNITED STATES PATENTS

| | | | |
|---|---|---|---|
| 2,664,440 | 12/1953 | Toland | 260—525 |
| 2,697,723 | 12/1954 | Carlston et al. | 260—525 |
| 2,841,615 | 7/1958 | Schutt et al. | 260—525 |
| 2,905,709 | 9/1959 | Schenk et al. | 260—525 X |
| 2,930,813 | 3/1960 | Shenk et al. | 260—525 X |

FOREIGN PATENTS

| | | |
|---|---|---|
| 1,015,785 | 9/1957 | Germany. |
| 777,782 | 6/1957 | Great Britain. |

OTHER REFERENCES

Weissberger: Technique of Organic Chemistry, vol. 3, pp. 406–7 (1950), vol. 3, Pt. I, pp. 396–7 and 485–8 (1956).

LORRAINE A. WEINBERGER, *Primary Examiner.*

LEON ZITVER, *Examiner.*

M. S. JAROSZ, S. B. WILLIAMS,
*Assistant Examiners.*